3,147,310
PREPARATION OF AMINES
Stanley J. Brois, Westfield, and Alfred J. Rutkowski, Colonia, N.J., assignors to Esso Research and Engineering Company, a corporation of Delaware
No Drawing. Filed Apr. 6, 1962, Ser. No. 185,507
8 Claims. (Cl. 260—583)

The present invention relates to the preparation of organic amines, e.g. secondary alkyl amines, from nitric oxide and organo metal compounds. One aspect of the invention concerns the synthesis of dialkyl amines from Group IIIA metal alkyl compounds and nitric oxide. Another aspect of the invention relates to the preparation of aromatic amines from Group IIIA alkylaryl metal compounds and nitric oxide.

It has been found that Group IIIA metal di- and trihydrocarbyl compounds react with nitric oxide to form an intermediate which can be easily converted into the corresponding primary and/or secondary amine. If the reaction is effected at moderately high temperatures (above about 100° C.) the amine is made in a single step, i.e. the intermediate is believed to be immediately converted to the amine product. On the other hand, by carrying out the first part of the reaction at lower temperatures not in excess of 100° C., e.g. 10° to 80° C., a stable intermediate is produced which upon heating is converted into the desired amine.

The metal polyhydrocarbyl reactant is preferably a trihydrocarbyl boron or aluminum compound. However, other Group IIIA (Periodic Chart of Elements on pages 56 and 57 of Lange's Handbook of Chemistry, 8th edition) metal compounds, such as dialkyl metal hydrides, can be used. The organic moieties are usually straight or branched alkyl groups. They can also be cyclic hydrocarbon radicals, such as alkylaryl and cycloalkyls. Each group generally has 2 to 18 carbon atoms and preferably is the same hydrocarbyl group containing 4 to 8 carbon atoms. Among the metal dihydrocarbyl and trihydrocarbyl compounds that can be employed are aluminum triethyl, boron tri-n-butyl, boron tricyclohexyl, boron tri(-2-phenylethyl), aluminum triisobutyl, aluminum trioctadecyl, boron tridodecyl, boron triethylphenyl, di-n-butyl aluminum hydride, dioctyl boron hydride, aluminum tri-cyclohexyl, and gallium triethyl.

Organic substituted metal hydrides, e.g. alkyl boron dihydride, dialkyl boron monohydride, dialkylaluminum hydride etc. when reacted with nitric oxide form mixtures of primary and secondary amines. For example, when one mole of didodecyl aluminum hydride is reacted with about two moles of nitric oxide either in a two step or a one step process as described herein, a mixture of dodecyl amine and bis-dodecyl amine is recovered after distillation of the reaction mixture.

In accordance with one embodiment of the invention, gaseous nitric oxide is contacted with a metal trialkyl compound, preferably trialkyl aluminum or trialkyl boron in a molar ratio of about 1:1 to 5:1, preferably about 2 to to 3:1, in a reaction zone at temperatures above about 100° C. but below the temperature at which the metal trialkyl compound commences to noticeably decompose. A suitable reaction temperature is about 110 to 150° C. and preferably about 120 to 140° C. The temperature can be regulated by controlling the addition of the gaseous nitric oxide. The two reactants are admixed in an inert atmosphere, such as nitrogen, helium or methane, in such a manner that the secondary amine product is rapidly formed. The rate of addition of the nitric oxide will affect the temperature of the reaction mixture. Therefore in most cases it is added at a moderate rate over a period of about 30 minutes to 5 hours. If efficient agitation is used at optimum temperatures, the amine product forms almost as soon as the nitric oxide gas is contacted with the organo metal reactant, which is, in most cases, a liquid.

The reactants can be contacted in several ways. For example, the nitric oxide can be bubbled through the liquid organo metal reactant at a moderate rate or the two substances can be reacted in a bomb under pressures of up to about 50 atmospheres, e.g. 3 to 5 atmospheres. In the latter case the reactor should be agitated in order to insure solubilization of the NO in the other reactant or solvent where one is used. Often the concentration of solvent in the reaction mixture is about 100 to 500 wt. percent, based on the organo metal compound.

Upon completion of the reaction, as evidenced by a decrease in temperature of a reaction mixture, the mixture is separated into its component parts, preferably by fractional distillation. It will be found that in most instances the yield of amine, based on the organo metal reactant, will be at least 30% . The amine products may be used for many purposes, such as mold release agents, rubber reclaiming agents for natural and synthetic rubber, polyurethane foam catalyst, pigment coating agent, ore flotation agents for non-metallic separations, anticoking agents, chemical intermediates for preparing dye retarders, antistatic agents, textile softeners and oil recovery agents. They can be reacted with acidic agents to alter properties of solubility, lubricity, wearability or corrosion inhibition for petroleum products. They have uses as oxidation inhibitors, anti-stalling agents, de-icers, synthetic lubricants, and surface active agents.

In another embodiment of the invention nitric oxide and the organo metal reactant are reacted in a molar ratio of about 1 to 5:1, preferably 2 to 3:1, in two stages, the first being advantageously effected at elevated temperatures up to about 100° C. and the second being carried out at temperatures above 100° C. In the first part of the process trialkyl aluminum or trialkyl boron is nitrosated with nitric oxide to produce a nitroso intermediate compound. This part of the process is usually effected at about 0 to 80° C. and preferably at about 40 to 60° C. Heating is usually not necessary because of the exothermic nature of the reaction. In fact the nitric oxide addition rate is used in some instances to control the reaction temperature. Again, as in the one step method, pressure is not a critical condition, and therefore for economic reasons it is recommended that approximately atmospheric pressure be used. Where the reaction is effected in a bomb, superatmospheric pressure, e.g. 2 to 50 atmospheres, is usually employed.

The intermediate compounds form almost immediately upon contacting the organo metal compound with NO. Agitation, of course, should be used to bring the gas and liquid reactants into close contact.

The reaction mixture is generally agitated for a few minutes after all of the reactants have been introduced and thereafter the temperature of the mixture is increased to between about 100 and 150° C. to effect the second step of the process. The second part of the process can be effected by simply distilling the reaction mixture from the fiirst step. If desired, a suitable inert liquid can be used as a solvent in either step to facilitate carrying out the process.

While it is not necessary t outilize a solvent in the process, it is usually preferably to do so because of the exothermic nature of the reactions. Any inert liquid, especially hydrocarbons, can be used as solvents. Among the saturated aliphatic, aromatic, and cycloaliphatic liquids that can be used are $C_5$ to $C_{18}$ compounds, such as benzene, cyclohexane, cetane, n-decane and n-heptane. The amount of solvent employed is not important since its principal function is to assist in controlling the temperature of the reaction mixture. However, for most purposes it will be found that about 50 to 1000 wt. percent, based on the organo metal reactant, of the selected solvent is satisfactory.

The principal difference between the one step and two step processes described above is the latter method permits the recovery of the intermediate product, e.g. precipitation with methanol, which then is converted to the amine by heating to the appropriate temperature. By this method it is possible to obtain a pure amine product because some of the contaminants can be removed in the intermediate recovery step. Other than this, the two processes are substantially the same in that they are both carried out in an inert atmosphere, e.g. nitrogen or helium, with agitation and preferably in the presence of an inert hydrocarbon solvent. While excesses of either reactant can be employed, it is generally best to effect the reactions with one molecule of nitric oxide per metal-carbon bond.

The following examples are submitted in order to provide a better understanding of the invention.

*Example 1*

A dry, nitrogen-flushed 500 ml. 4-necked flask equipped with a stirrer, thermometer, gas inlet tube and reflux condenser (having a Dry Ice-acetone trap) was charged with 0.5 mole of redistilled boron tri-n-butyl in 200 grams of n-heptane. Nitric oxide gas (1.5 moles) was then added through a fritted glass thimble bubbler over a period of about 2 hours. It was observed that the NO gas was rapidly adsorbed and that an exothermic reaction occurred. The temperature of the reaction mixture was maintained between 60 and 70° C. by controlling the rate of nitric oxide addition and external cooling until the color of the exit gas turned brown, indicating that the nitric oxide was no longer being adsorbed. The addition of NO was also controlled so that only a small amount of hydrocarbon was present in the exit gas. When no more NO was adsorbed, the reaction temperature commenced to fall and some foaming was observed. At this point, the reaction mixture was fractionally distilled at atmospheric pressure and a 35% yield of dibutyl amine (B.P. 152–154° C.) based on the boron reactant, was recovered.

*Example 2*

Example 1 was repeated with the exception that redistilled aluminum tri-n-butyl was used in place of the boron reactant. The yield of dibutyl amine was 33%, based on the aluminum reactant.

*Example 3*

Into a 3-liter rocked autoclave is placed 0.5 mole of tri-n-butyl aluminum dissolved in 200 ml. of anhydrous n-cetane. The autoclave is heated to between 125–135° C. and 2 moles of gaseous nitric oxide is admitted. The temperature is controlled by an internal cooling coil. After completion of the reaction (about 1 hour) as indicated by a leveling off of the pressure, the contents of the autoclave are cooled to room temperature and are then transferred to a distillation flask. Distillation of the reaction mixture gives dibutyl amine in high yield.

When the above reaction is carried out in glass equipment at atmospheric pressure while bubbling nitric oxide through the reaction mixture, careful control of the temperature is necessary because the reaction is violently exothermic.

*Example 4*

A dry, nitrogen flushed 500 ml. 4-necked flask equipped with a stirrer, thermometer, gas inlet tube and reflux condenser (having a Dry Ice-acetone trap) is charged with 0.5 mole of redistilled tri-n-butyl boron. No solvent is used. Nitric oxide (1.5 moles) is then added at a rate such that the temperature is maintained between 60–70° C. When no further adsorption of nitric oxide occurs the reaction mixture is distilled under reduced pressure at 100° C. Dibutyl amine is recovered in high yield based on the tributyl boron.

*Example 5*

The equipment used is identical to that used in Example 1. The reaction flask is charged with 0.5 mole of dibutyl aluminum hydride and 1 mole of nitric oxide is added over about a 2 hour period at a rate such that the temperature is maintained at between 80–100° C. Upon completion of the nitric oxide addition, the reaction mixture is distilled and a mixture of butyl amine and dibutyl amine are recovered. The amine mixture, i.e. dibutyl amine and butyl amine, is redistilled at atmospheric pressure and each amine is recovered in good yields.

*Example 6*

The equipment used is identical to that used in Example 1. The reactor is charged with 0.5 mole of triphenyl boron dissolved in 100 ml. of anhydrous n-heptane. The nitric oxide (1.5 moles) is added at a rate such that the temperature is maintained between 70–80° C. When no further adsorption of nitric oxide occurs the reaction mixture is fractionally distilled at atmospheric pressure and diphenyl amine is recovered.

*Example 7*

The process in Example 6 is repeated except triphenyl aluminum is substituted for the triphenyl boron.

*Example 8*

Example 6 is repeated except that triethyl boron is used in place of triphenyl boron.

*Example 9*

Example 8 is repeated except that the process is effected in one step by carrying out the reaction at about 140° C. and the fractional distillation is effected at reduced pressure (about 10 mm. of mercury).

It is not intended to restrict the present invention to the foregoing examples which are merely given to demonstrate some of the embodiments of the invention. It should only be limited to the appended claims in which it is intended to claim all of the novelty inherent in the invention as well as the modifications and equivalents coming within the scope and spirit of the invention.

What is claimed is:

1. Process for preparing amines which comprises contacting nitric oxide with a Group IIIA metal polyhydrocarbyl compound each hydrocarbyl group of which contains 2 to 18 carbon atoms at a temperature above about 100° C. to form an amine product and distilling the resultant mixture to recover said product.

2. Process for preparing secondary amines which comprises contacting nitric oxide with a Group IIIA metal trihydrocarbyl compound each hydrocarbyl group of which contains 2 to 18 carbon atoms, heating the resulting mixture to a temperature above about 100° C. at which an amine product is formed and distilling the resultant mixture to recover said product.

3. Process according to claim 2 in which the nitric oxide and metal trihydrocarbyl compound are contacted at a temperature of about 0 to 80° C. and thereafter the temperature of the reaction mixture is raised to about 100–150° C. to produce secondary amines as the principal reaction product.

4. Process for preparing primary and secondary amines which comprises contacting nitric oxide with a Group IIIA metal dihydrocarbyl hydride each hydrocarbyl group of which contains 2 to 18 carbon atoms at a temperature above 100° C. but below the decomposition temperature of said hydride thereby forming a primary amine and a secondary amine, and distilling the resultant mixture to recover the amines so formed.

5. Process for preparing secondary alkyl amines which comprises contacting nitric oxide with a metal trialkyl compound each alkyl group of which contains 2 to 18 carbon atoms, the metal portion of which compound is selected from the group consisting of boron and aluminum, in a molar ratio of about 1 to 5:1 at temperatures above about 100° C. but below the decomposition temperature of said compound in the presence of an inert hydrocarbon solvent until a secondary alkyl amine is formed and distilling the resultant mixture to recover said amine.

6. Process according to claim 5 in which the metal trialkyl compound is a boron trialkyl each alkyl of which contains 4 to 8 carbon atoms.

7. Process according to claim 5 in which the metal trialkyl compound is an aluminum trialkyl each alkyl of which contains 4 to 8 carbon atoms.

8. Process for preparing dibutyl amine which comprises bubbling gaseous nitric oxide through liquid boron tri-n-butyl in a reaction zone maintained at about 110° to 150° C. and approximately atmospheric pressure until no more nitric oxide is taken up by the liquid, withdrawing the resulting mixture from reaction zone, and distilling the mixture to recover dibutyl amine.

No references cited.